US012594767B2

(12) United States Patent
Fukui et al.

(10) Patent No.: US 12,594,767 B2
(45) Date of Patent: Apr. 7, 2026

(54) INK CARTRIDGE AND METHOD FOR REMANUFACTURING INK CARTRIDGE

(71) Applicant: CANON KABUSHIKI KAISHA, Tokyo (JP)

(72) Inventors: Shigeki Fukui, Kanagawa (JP); Shinichi Miyauchi, Kanagawa (JP); Hitoshi Takada, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 130 days.

(21) Appl. No.: 18/588,786

(22) Filed: Feb. 27, 2024

(65) Prior Publication Data

US 2024/0300244 A1 Sep. 12, 2024

(30) Foreign Application Priority Data

Mar. 7, 2023 (JP) ................................ 2023-034301
Dec. 12, 2023 (JP) ................................ 2023-209163

(51) Int. Cl.
*B41J 2/175* (2006.01)

(52) U.S. Cl.
CPC ....... *B41J 2/17513* (2013.01); *B41J 2/17559* (2013.01)

(58) Field of Classification Search
CPC .... B41J 2/175; B41J 2/17503; B41J 2/17506; B41J 2/17509; B41J 2/17513; B41J 2/17533; B41J 2/17536; B41J 2/1754; B41J 2/17553; B41J 2/17556; B41J 2/17559
See application file for complete search history.

(56) References Cited

U.S. PATENT DOCUMENTS

| | | | | |
|---|---|---|---|---|
| 6,000,788 | A * | 12/1999 | Iida | F16K 15/144 137/859 |
| 6,302,530 | B1 * | 10/2001 | Shimada | B41J 2/17553 347/86 |
| 6,416,152 | B1 * | 7/2002 | Matsuzaki | B41J 2/17513 347/19 |
| 6,814,433 | B2 * | 11/2004 | Putman | B41J 2/19 347/86 |
| 9,452,609 | B2 * | 9/2016 | Myers | B41J 2/1752 |
| 2001/0048457 | A1 * | 12/2001 | Hara | B41J 2/17513 347/86 |
| 2010/0103232 | A1 | 4/2010 | Fukushima | |

FOREIGN PATENT DOCUMENTS

| | | | |
|---|---|---|---|
| GB | 2315461 | A | 2/1998 |
| JP | 2010100009 | A | 5/2010 |
| JP | 2020192719 | A | 12/2020 |
| JP | 2022111988 | A | 8/2022 |

* cited by examiner

*Primary Examiner* — Anh T Vo
(74) *Attorney, Agent, or Firm* — CANON U.S.A., INC. IP DIVISION

(57) ABSTRACT

An ink cartridge includes a casing and a seal member. The casing includes an ink storage section storing ink, an air communication hole that is a through hole to cause the ink storage section to communicate with air, and an air communication passage that is a groove connected to the air communication hole. The seal member covers an entire area of an opening of the air communication hole and an entire area of the air communication passage. A recess different from the air communication passage is formed in an area of the casing covered with the seal member. Part of an opening of the recess is exposed from the seal member.

20 Claims, 18 Drawing Sheets

INK CARTRIDGE AND METHOD FOR REMANUFACTURING INK CARTRIDGE

BACKGROUND

Field

The present disclosure relates to an ink cartridge and a method for remanufacturing an ink cartridge.

Description of the Related Art

An ink cartridge having an ink injection port for injecting ink, an ink supply port for supplying the ink, and an air communication section has been known as a typical ink cartridge to be used in an inkjet recording apparatus. Japanese Patent Application Laid-Open No. 2010-100009 discusses an ink cartridge having a housing capable of storing ink, an atmospheric communication portion provided in the housing, and an ink supplying port to supply ink to an inkjet recording device.

In an inkjet recording apparatus, images and characters are recorded by attaching a conventional ink cartridge to the inkjet recording apparatus and supplying ink in the conventional ink cartridge to a liquid discharge head of the inkjet recording apparatus through an ink supply port. The ink can be smoothly supplied by taking air into the conventional ink cartridge through an air communication section while the ink is supplied from the conventional ink cartridge to the liquid discharge head.

Some conventional ink cartridges have an ink injection port through which ink is injected during manufacturing. In transporting such ink cartridges, the ink injection port and the air communication section are covered with a seal member, for example, to prevent evaporation and ink leakage. The environmental impact of plastic wastes, such as ink cartridges, has become a major concern in recent years, and the recycling of ink cartridges is being demanded. Accordingly, the seal member of the air communication section may not be dissolvable in ink for easy recycling. If the ink injection port is sealed up with a seal member, the seal member is desirably peeled off to refill the ink during remanufacturing. If there is no ink injection port, a new ink injection port is formed. Even in such a case, the seal member is desirably peeled off because the seal member covering the air communication section lowers the productivity. In a configuration lacking ingenuity to peel off the seal member, the seal member is difficult to peel off.

SUMMARY

The present disclosure is directed to providing an ink cartridge from which an attached seal member can be easily peeled off and a method for remanufacturing such an ink cartridge.

According to an aspect of the present disclosure, an ink cartridge includes a casing including an ink storage section configured to store ink, an air communication hole that is a through hole configured to cause the ink storage section to communicate with air, and an air communication passage that is a groove connected to the air communication hole, and a seal member configured to cover an entire area of an opening of the air communication hole and an entire area of the air communication passage, wherein a recess different from the air communication passage is formed in an area of the casing covered with the seal member, and wherein part of an opening of the recess is exposed from the seal member.

Further features of the present disclosure will become apparent from the following description of exemplary embodiments with reference to the attached drawings.

DESCRIPTION OF THE EMBODIMENTS

Figure 1:
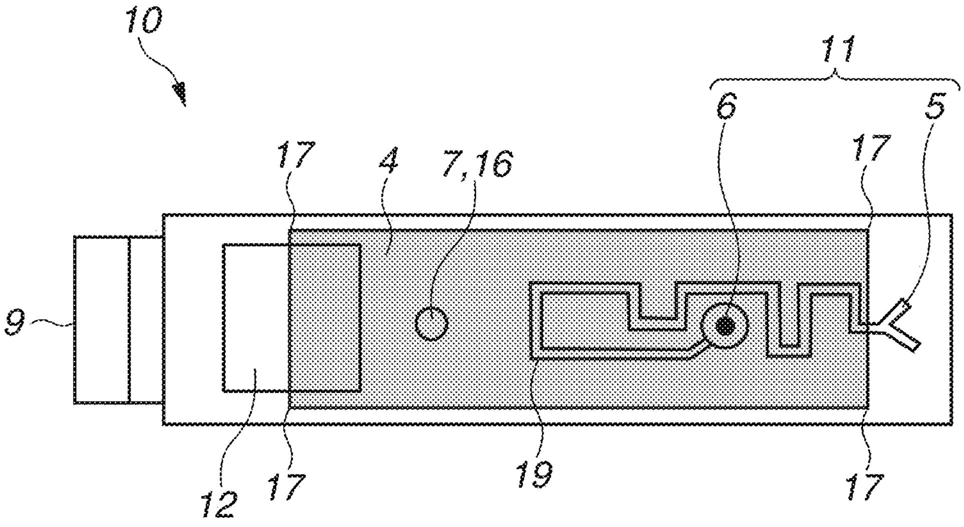
FIG. 1 is a top view of an ink cartridge.

Exemplary embodiments of the present disclosure will be described with reference to the drawings. The following exemplary embodiments are not intended to limit the disclosures, and all combinations of features described in the exemplary embodiments are not necessarily essential to the present disclosure. The relative arrangement and shapes of components described in the exemplary embodiments are only illustrative and not intended to limit the scope of the present disclosure thereto. Similar components will be designated by the same reference numerals.

Figure 2:
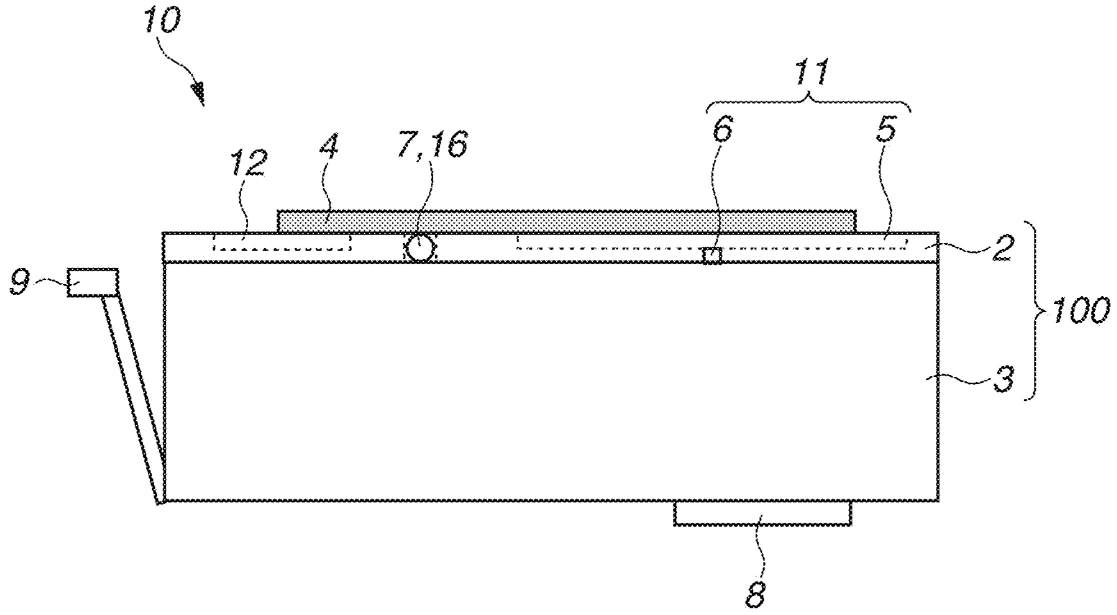
FIG. 2 is a side view of the ink cartridge.

FIG. 1 is a top view of an ink cartridge according to a first exemplary embodiment. FIG. 2 is a side view of the ink cartridge according to the present exemplary embodiment. The ink cartridge according to the present exemplary embodiment is mounted on an inkjet recording apparatus, and images and characters can be recorded by supplying ink stored in the ink cartridge to a liquid discharge head for discharging the ink.

An ink cartridge 10 includes an ink storage member 3 having an opening (not illustrated), and a lid member 2 joined to the ink storage member 3 so that the opening of the ink storage member 3 is closed. The ink storage member 3 may include a section for storing the ink inside (ink storage section). An absorber (not illustrated) to be impregnated with and thereby hold the ink may be accommodated in the ink storage section. The ink cartridge 10 may be without the lid member 2. The ink cartridge 10 may be configured so that an ink injection port 7 and an air communication section 11 to be described below are formed in the ink storage member 3.

The lid member 2 has the ink injection port 7 for injecting the ink into the inside of the ink cartridge 10, i.e., the ink storage member 3. The ink injection port 7 is desirably sealed up with a sealing member 16. This can prevent ink leakage and ink evaporation through the ink injection port 7.

The ink cartridge 10 includes a seal member 4 attached to close the entire area of the ink injection port 7. The seal member 4 can be attached by temporarily placing or temporarily bonding the seal member 4 onto the ink cartridge 10 and pressing a hot heating plate called seal head (not illustrated) against the seal member 4. Heat is conducted from over the seal member 4 to the ink cartridge 10, whereby a part of the seal member 4 and the lid member 2 are melted and joined. The seal member 4 has a thickness of approximately 40 μm to 120 μm, for example. The method for attaching the seal member 4 is not limited to the above example, and other methods may be used.

The air communication section 11 is formed in the lid member 2. The air communication section 11 includes an air communication hole 6 and an air communication passage 5. The air communication hole 6 is a through hole for communicating the air to the inside of the ink cartridge 10, i.e., the ink storage member 3. The air communication passage 5 is a groove for letting the air into the air communication hole 6.

The air communication passage 5 includes a plurality of bends 19 and extends from the air communication hole 6. The presence of such an air communication section 11 enables the air to be taken into the ink cartridge 10 through the air communication section 11 while the ink is supplied from the ink storage member 3 to a liquid discharge head (not illustrated) via an ink supply port 8. This maintains the internal pressure of the ink cartridge 10 constant, whereby the ink can be smoothly supplied from the ink cartridge 10 to the liquid discharge head. The ink cartridge 10 according to the present exemplary embodiment may be one equipped with a recording element substrate for discharging the ink (disposable head).

If the entire air communication section 11 is exposed, ink leakage or evaporation from the air communication hole 6 can occur. Ink evaporation increases the viscosity of the ink, and appropriate liquid discharge from the recording element substrate can be difficult. The seal member 4 is thus desirably configured to cover the air communication hole 6 and part of the air communication passage 5. With such a configuration, the air communication hole 6 of large diameter is covered with the seal member 4 to prevent ink leakage and evaporation while part of the air communication passage 5 of small diameter communicates with the air so that the air can be let into the ink cartridge 10.

Figure 17:
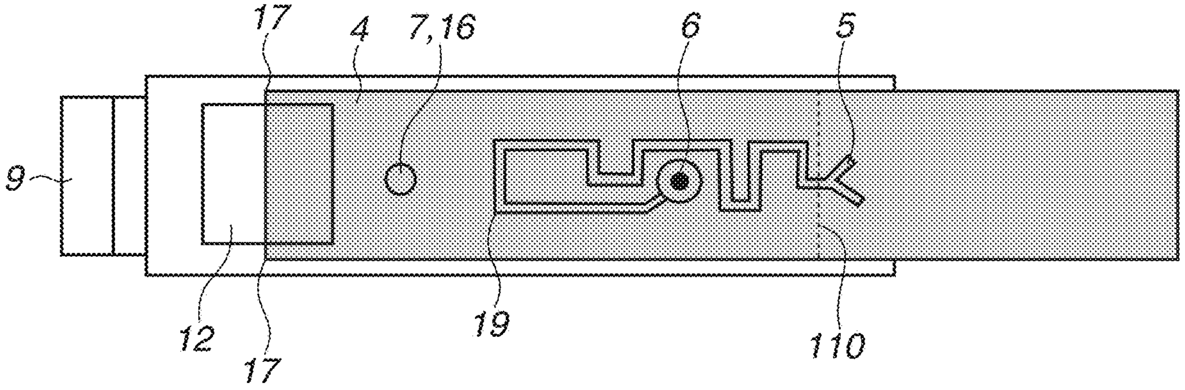
FIG. 17 is a top view of an ink cartridge during transportation.

As illustrated in FIG. 17, the opening of the air communication hole 6 and the entire area of the air communication passage 5 are sealed up with the seal member 4 during transportation. Before the ink cartridge 10 is attached to the inkjet recording apparatus, a part of the seal member 4 covering the air communication passage 5 is peeled off with a perforation 110 as a starting point, whereby the air is let into the air communication hole 6 via the air communication passage 5. This can let the air into the ink cartridge 10 during image formation by the inkjet recording apparatus while preventing ink leakage and evaporation during transportation. The ink cartridge 10 desirably includes a lever portion 9 to facilitate attachment and detachment to/from the inkjet recording apparatus. The arrangement of the air communication passage 5 can be adjusted as appropriate.

The unit including the ink storage section, the air communication hole 6, and the air communication passage 5 may be referred to as a casing 100. The casing 100 includes the ink storage member 3 and the lid member 2.

If the used ink cartridge 10 is reused, ink is desirably reinjected into the ink cartridge 10. In such a case, the ink can be reinjected through the ink injection port 7. The seal member 4 is desirably peeled off because the ink injection port 7 is covered with the seal member 4.

Figure 13:
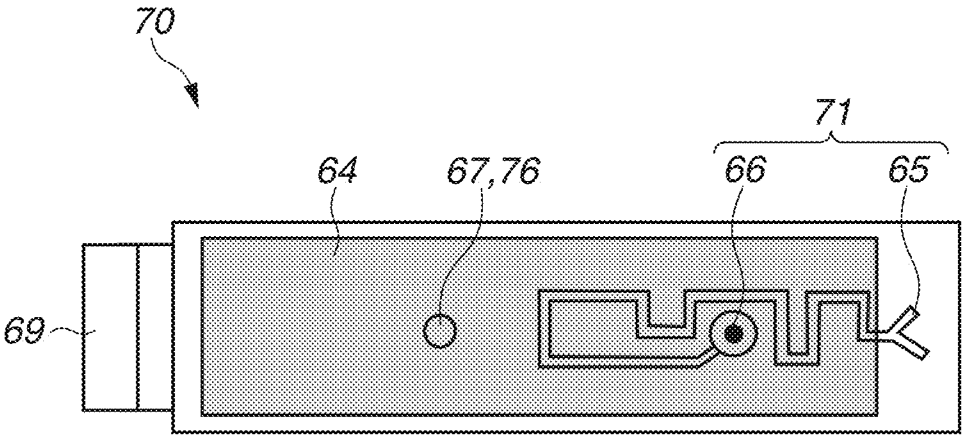
FIG. 13 is a top view of an ink cartridge according to a comparative example.
Figure 14:
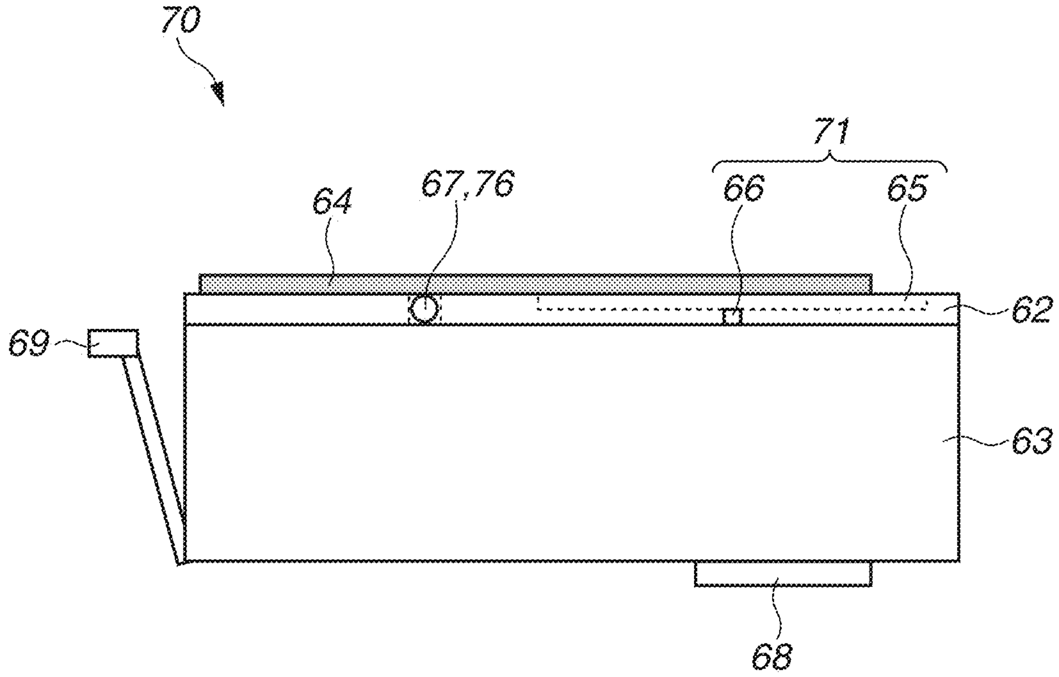
FIG. 14 is a side view of the ink cartridge according to the comparative example.

FIGS. 13 and 14 are a top view and a side view, respectively, of an ink cartridge 70 according to a comparative example. The ink cartridge 70 includes an ink storage member 63 and a lid member 62. An air communication section 71 (air communication hole 66 and air communication passage 65) is formed in the lid member 62. The lid member 62 also has an ink injection port 67. The ink injection port 67 is sealed with a sealing member 76. The ink cartridge 70 includes a lever portion 69 intended for attachment and detachment to/from an inkjet recording apparatus. Ink in the ink storage member 63 is supplied to a liquid discharge head (not illustrated) via an ink supply port 68.

The ink injection port 67 is covered with a seal member 64. The ink cartridge 70 of the comparative example does not have a starting point to peel the seal member 64 from the lid member 62, and the seal member 64 can be difficult to peel off. The thinner the seal member 64 is, the more difficult the seal member 64 is to peel off.

By contrast, the ink cartridge 10 of the present exemplary embodiment has a recess 12 different from the air communication hole 6 in a portion of the lid member 2 opposed to the attachment surface of the seal member 4. At least part of the recess 12 is exposed from the seal member 4. With such a configuration, the seal member 4 can be easily peeled off by using the portion of the seal member 4 covering the recess 12 as a starting point. Moreover, an end of the seal member 4 desirably covers at least part of the recess 12. The seal member 4 can thereby be more easily peeled off because the seal member 4 can be peeled starting at the end of the seal member 4 covering the recess 12. If the ink cartridge 10 is without the lid member 2, the recess 12 may be formed in the ink storage member 3. The location where the recess 12 is formed is not limited in particular. The recess 12 may be formed near the air communication passage 5.

The seal member 4 desirably has a polygonal shape, with all corners 17 of the seal member 4 attached to the lid member 2. Such a configuration can prevent the seal member 4 from curling up since all the corners 17 of the seal member 4 are attached even if the seal member 4 has an area not attached to the lid member 2 due to the recess 12. The seal member 4 can thereby be prevented from coming off the lid member 2 or interfering with handling when the user uses the ink cartridge 10 or during transportation.

The recess 12 desirably has a length ½ or more of the length of the casing 100 in a transverse direction of the surface of the casing 100 where the recess 12 is formed. With such a configuration, the seal member 4 can be easily peeled off because the area of the seal member 4 to serve as a starting point due to the recess 12 in the process of peeling off the seal member 4 increases.

If the seal member 4 is welded to the lid member 2, the surface of the seal member 4 is desirably heated by an iron or a heating plate while the seal member 4 is peeled in the process of peeling off the seal member 4. The seal member 4 being heated can be easily peeled off because the welded seal member 4 melts. For example, the seal member 4 is heated at 140° C. for about 60 seconds.

Figure 3:
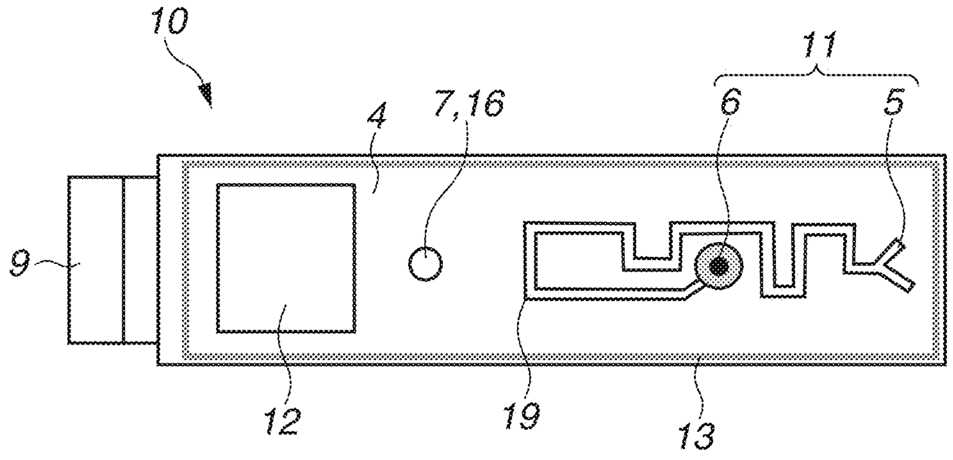
FIG. 3 is a top view of the ink cartridge, illustrating a joint between an ink storage member and a lid member.
Figure 4:
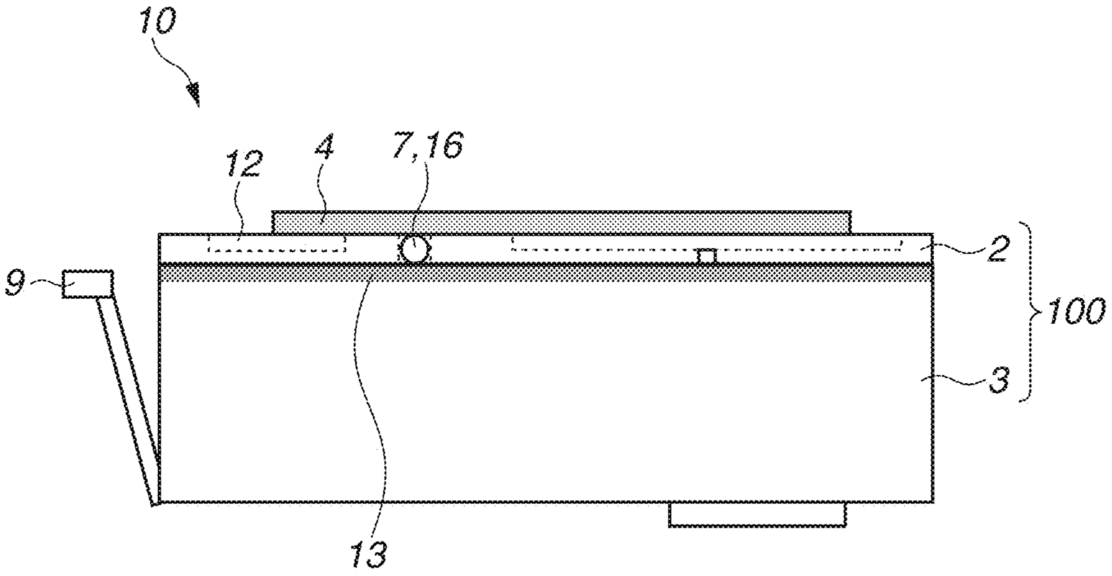
FIG. 4 is a side view of the ink cartridge, illustrating the joint between the ink storage member and the lid member.

The arrangement of a joint 13 between the ink storage member 3 and the lid member 2 will be described. FIGS. 3 and 4 are a top view and a side view of the ink cartridge 10, respectively, and illustrate the joint 13. The ink storage member 3 and the lid member 2 are ultrasonically welded via a welding rib (not illustrated) on the lid member 2. Here, the ultrasonic vibration is less likely to propagate to the space in the recess 12, and the ink storage member 3 and the lid member 2 can fail to be satisfactorily welded there. The recess 12 is therefore desirably formed at a position not overlapping with the joint 13 between the lid member 2 and the ink storage member 3 when seen in the joining direction of the lid member 2 and the ink storage member 3 (when seen from a position opposed to the main surface of the lid member 2). The method for joining the ink storage member 3 and the lid member 2 is not limited to ultrasonic welding.

The lid member 2 has a thickness of approximately 2.5 mm, for example. The recess 12 has a depth of approximately 1.2 mm, for example. The seal member 4 can be easily peeled off the lid member 2 by pinching the seal member 4 over the recess 12 with thin pincers or a thin robot hand and pulling the seal member 4 in the peeling direction.

Figure 5:
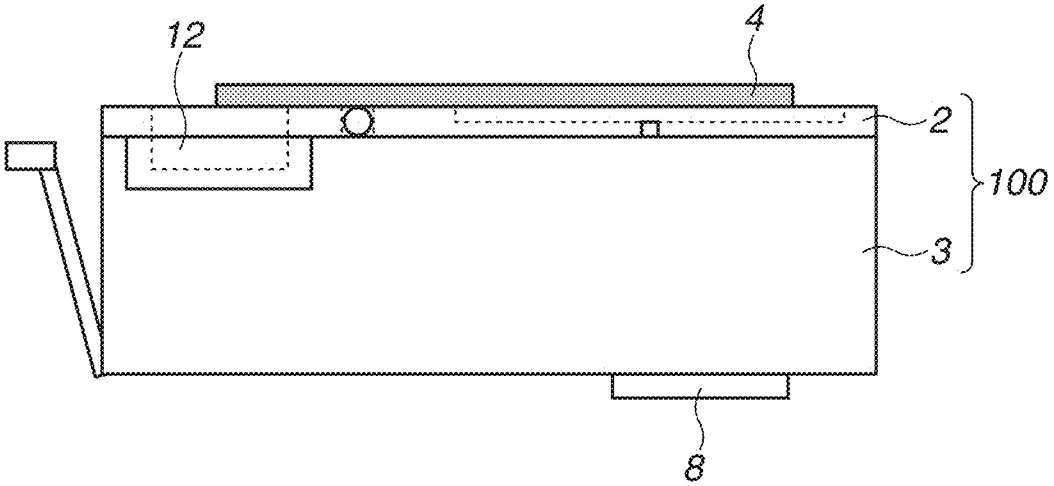
FIG. 5 is a side view of an ink cartridge with a thick region where a recess is formed.

As illustrated in FIG. 5, the region of the lid member 2 where the recess 12 is formed desirably has a thickness greater than that of the region where the recess 12 is not formed. For example, the recess 12 desirably has a depth of approximately 2.5 mm, and the region of the lid member 2 where the recess 12 is formed desirably has a thickness of approximately 3.9 mm. The increased depth of the recess 12 enables insertion of thicker pincers or a thicker robot hand for pinching the seal member 4 into the gap between the seal member 4 and the recess 12 in the process of peeling off the seal member 4. The increased thickness of the lid member 2 can prevent defective molding of the lid member 2.

Figure 6:
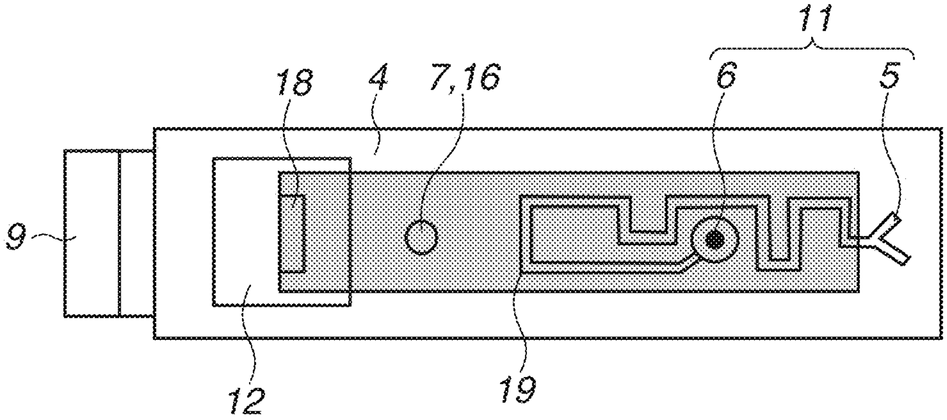
FIG. 6 is a top view of an ink cartridge where a projection is formed in a recess.
Figure 7:
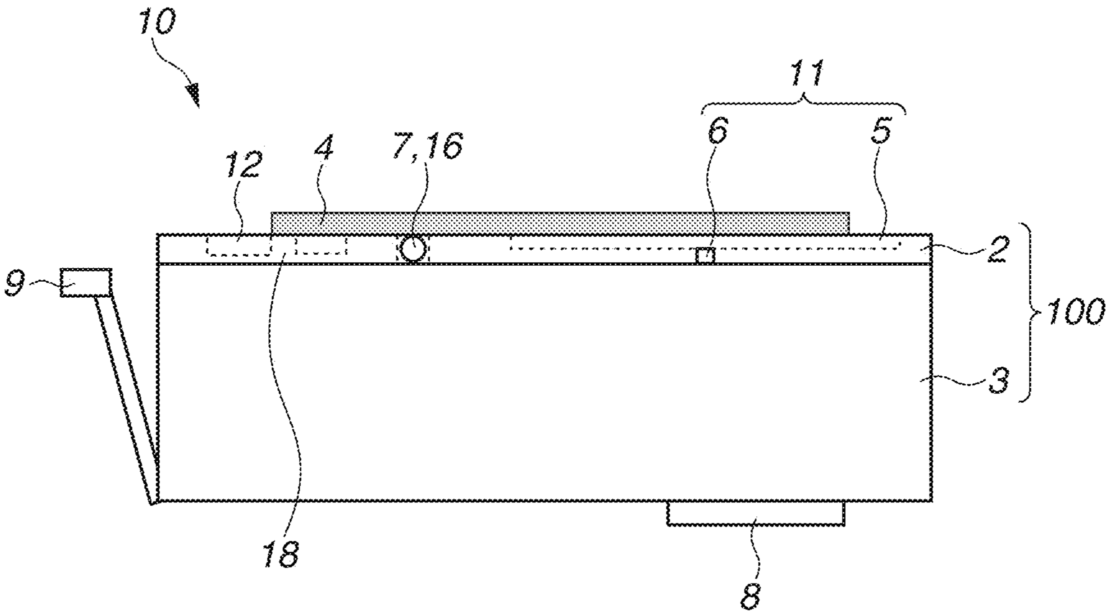
FIG. 7 is a side view of the ink cartridge where the projection is formed in the recess.

A projection 18 for the seal member 4 to be attached to is desirably formed in the recess 12. FIGS. 6 and 7 are a top view and a side view, respectively, of the ink cartridge 10 where the projection 18 is formed in the recess 12. Attaching the seal member 4 to the projection 18 as well can prevent the seal member 4 from curling up even if the seal member 4 has an unattached area due to the recess 12. Such a configuration can also prevent the seal member 4 from coming off the lid member 2 or interfering with handling during transportation or when the user uses the ink cartridge 10.

The seal member 4 is desirably attached to an area ½ or more of the side of the casing 100 where the seal member 4 is attached. Such a configuration can prevent the seal member 4 from curling up.

Figure 18:
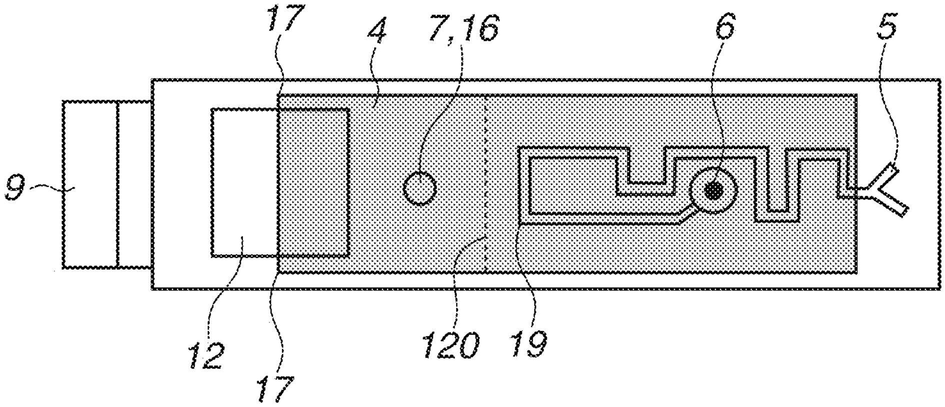
FIG. 18 is a top view of an ink cartridge with a seal member having a separable portion.

As illustrated in FIG. 18, a separable portion 120 to separate the seal member 4 is desirably formed between the area where the seal member 4 covers the recess 12 and the area where the seal member 4 covers the air communication hole 6 and the air communication passage 5. The seal member 4 peeled starting at the recess 12 can thereby be separated at the position of the separable portion 120. Because the area of the seal member 4 covering the air communication hole 6 and the air communication passage 5 does not need to be peeled off, a second seal member does not need to be attached to the area covering the air communication hole 6 and the air communication passage 5 in remanufacturing the ink cartridge 10. In the remanufacturing step, a second seal member is desirably attached to the part of the air communication passage 5 exposed from the seal member 4.

With such a configuration, the seal member 4 attached to cover the ink injection port 7 can be easily peeled off because of the presence of the recess 12. Moreover, the ink cartridge 10 can be remanufactured by performing an injection step of reinjecting ink through the ink injection port 7 after the peeling step of peeling the seal member 4 off the lid member 2. In addition, an ink cartridge with ink evaporation prevention can be remanufactured by attaching the second seal member to the casing 100 so that the ink injection port 7 and the entire area of the air communication section are covered. An ink cartridge from which the second seal member can be easily peeled can be remanufactured by attaching the second seal member to cover at least part of the recess 12.

A configuration of an ink cartridge according to a second exemplary embodiment of the present disclosure will be described. In the following description, differences from the first exemplary embodiment are mainly described. A description of similarities to the first exemplary embodiment will be omitted.

Figure 8:
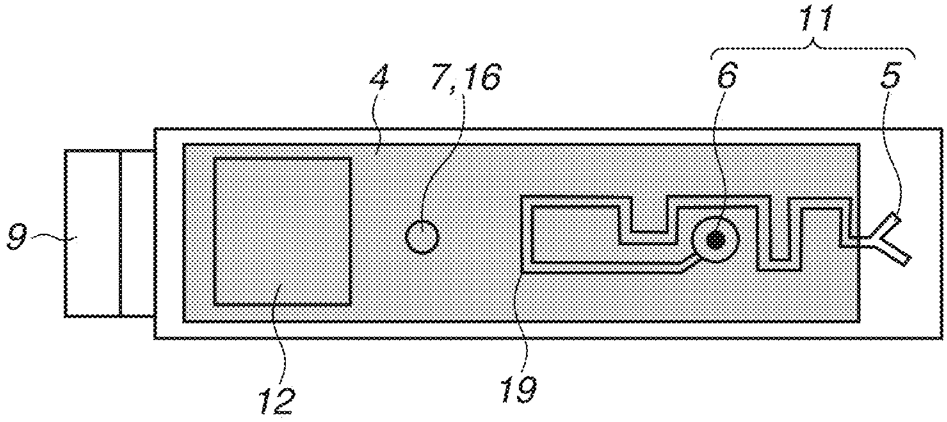
FIG. 8 is a top view of an ink cartridge where the entire area of a recess is covered with a seal member.
Figure 9:
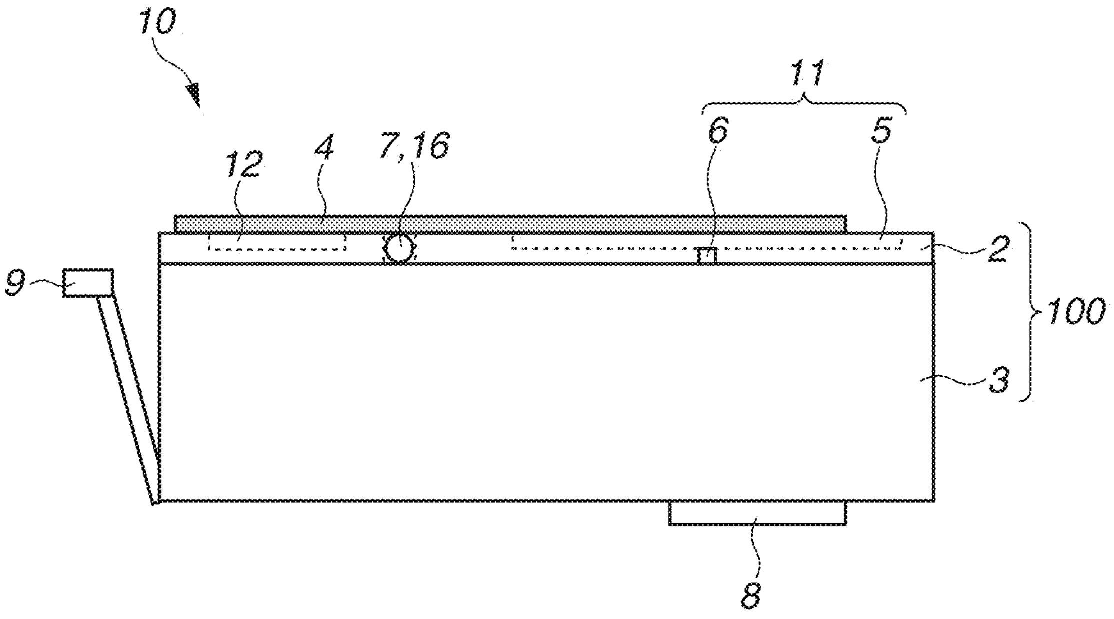
FIG. 9 is a side view of the ink cartridge where the entire area of the recess is covered with the seal member.

FIGS. 8 and 9 are a top view and a side view, respectively, of an ink cartridge 10 where an entire recess 12 is covered with a seal member 4. Unlike the first exemplary embodiment, the ink cartridge 10 according to the present exemplary embodiment is configured so that the entire recess 12 is covered with the seal member 4. Even if the entire recess 12 is covered with the seal member 4, the seal member 4 can be easily peeled off by pushing the seal member 4 into the recess 12, compared to the case without the recess 12.

Figure 10:
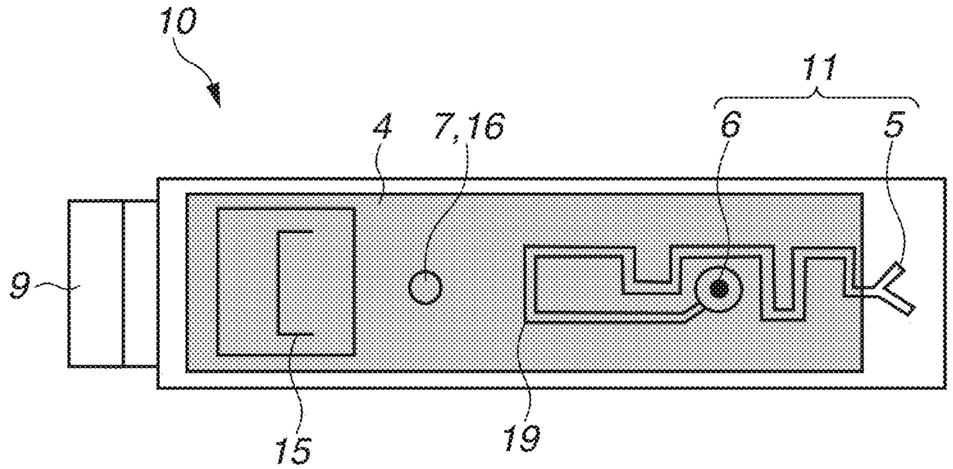
FIG. 10 is a top view of an ink cartridge with a seal member having a cut.

In the ink cartridge 10 in the state illustrated in FIGS. 8 and 9, a cut is desirably formed in the part of the seal member 4 covering the recess 12. FIG. 10 is a top view of the ink cartridge 10 where a U-shaped cut 15 is formed. With such a configuration, pincers or a robot hand for peeling the seal member 4 can be easily inserted into the cut 15, and the seal member 4 can be easily peeled off. Because the seal member 4 is attached to a lid member 2 even at the end, the seal member 4 can be prevented from curling up. The seal member 4 can thus be prevented from coming off the lid member 2 or interfering with handling during transportation or when the user uses the ink cartridge 10. The shape of the cut 15 is not limited to the U-shape. The cut 15 may have any shape as long as the pincers or robot hand can be inserted.

Even with such a configuration where the entire recess 12 is covered with the seal member 4, the seal member 4 attached to cover an ink injection port 7 can be easily peeled off. This facilitates reuse of the ink cartridge 10.

A configuration of an ink cartridge according to a third exemplary embodiment of the present disclosure will be described. In the following description, differences from the first exemplary embodiment are mainly described. A description of similarities to the first exemplary embodiment will be omitted.

An ink cartridge 30 according to the present exemplary embodiment differs from the ink cartridge 10 of the first exemplary embodiment in that the ink injection port 7 is not formed. The present exemplary embodiment will be described by using the ink cartridge 30 that is integrated with a recording element substrate 28 for discharging ink as an example.

Figure 11:
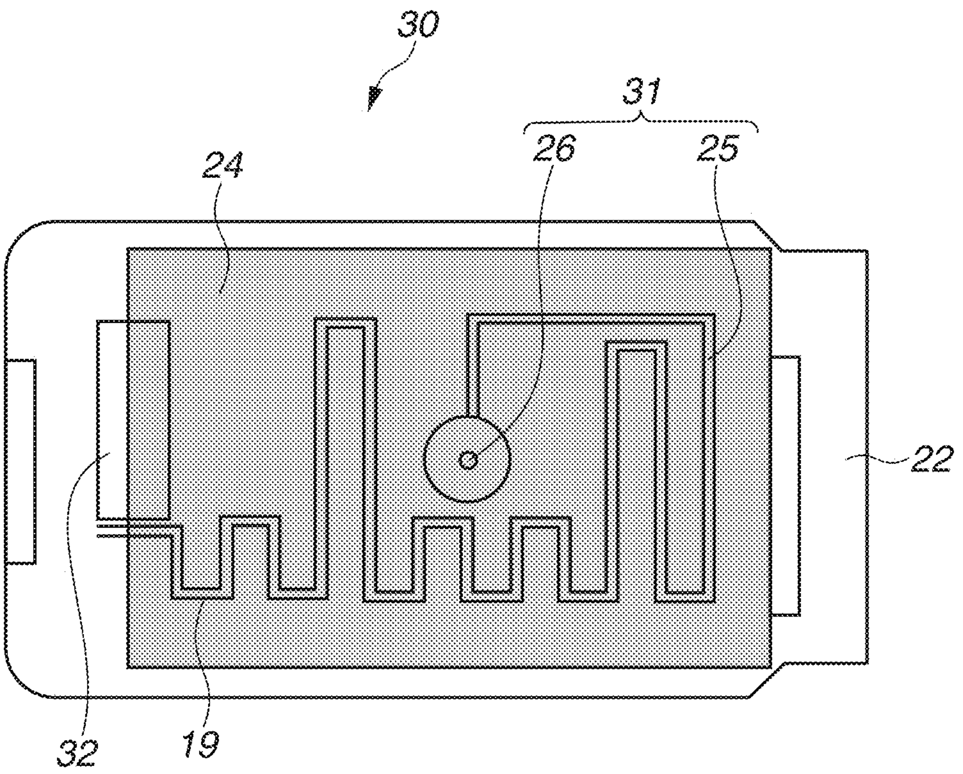
FIG. 11 is a top view of an ink cartridge without an ink injection port.
Figure 12:
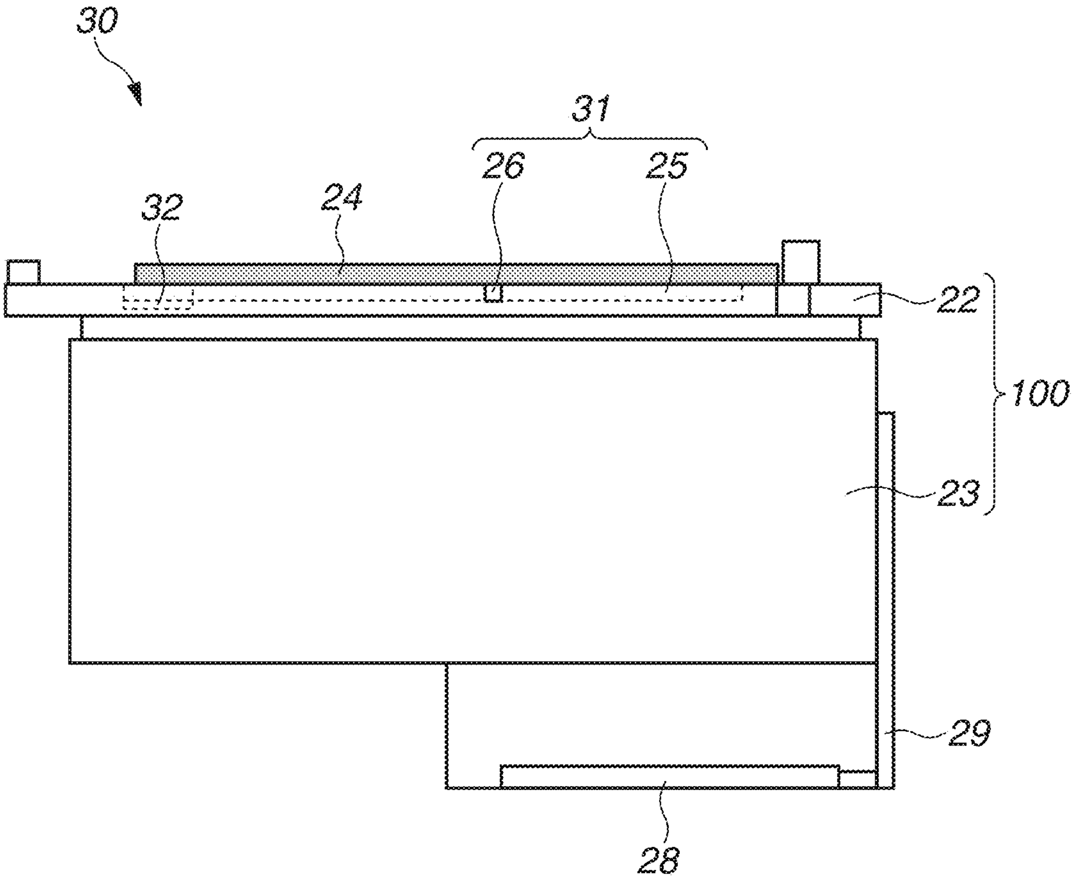
FIG. 12 is a side view of the ink cartridge without an ink injection port.

FIGS. 11 and 12 are a top view and a side view, respectively, of the ink cartridge 30 where an ink injection port is not formed and with which the recording element substrate 28 is integrated. With the recording element substrate 28 integrated, the ink cartridge 30 of the present exemplary embodiment is mounted on an inkjet recording apparatus, and ink stored in the ink cartridge 30 is discharged from the ink cartridge 30 (recording element substrate 28). The ink cartridge 30 includes an ink storage member 23 having an opening (not illustrated) and a lid member 22 joined to the ink storage member 23 so that the opening of the ink storage member 23 is closed. The ink storage member 23 is a section for storing the ink inside. An absorber (not illustrated) to be impregnated with and thereby hold the ink may be accommodated in the ink storage member 23.

The ink storage member 23 includes contact pads 29 for electrically connecting the recording element substrate 28 for discharging ink with the inkjet recording apparatus. The recording element substrate 28 is powered by the inkjet recording apparatus via the contact pads 29, and generates pressure to discharge the ink from the power. The recording element substrate 28 may be a thermal recording element substrate that generates the pressure to discharge the ink using a thermoelectric transducer, or a piezoelectric recording element substrate that generates the pressure to discharge the ink using a piezoelectric element. Various other liquid discharge methods may be used.

The lid member 22 according to the present exemplary embodiment does not have an ink injection port for injecting the ink into the ink storage member 23. The method for injecting the ink into the ink cartridge 30 will be described below. The lid member 22 includes an air communication section 31. The air communication section 31 includes an air communication hole 26 for communicating the air to the ink storage member 23, and an air communication passage 25 for letting the air into the air communication hole 26. The presence of the air communication section 31 enables the air to be taken into the ink cartridge 30 through the air communication section 31 while the recording element substrate 28 discharges the ink. This maintains the internal pressure of the ink cartridge 30 constant, whereby the ink can be smoothly discharged from the ink cartridge 30 (recording element substrate 28).

If the entire air communication section 31 is exposed, ink leakage or evaporation from the air communication hole 26 can occur. Ink evaporation increases the viscosity of the liquid, and appropriate liquid discharge from the liquid discharge head (recording element substrate 28) can be difficult. For that reason, the ink cartridge 30 includes a seal member 24 that covers part of the air communication passage 25 and the air communication hole 26. With such a configuration, the air communication hole 26 of large diameter is covered with the seal member 24 to prevent ink leakage and evaporation while part of the air communication passage 25 of small diameter communicates with the air so that the air can be let into the ink cartridge 30. The route arrangement of the air communication passage 5 can be adjusted as appropriate.

The seal member 24 is attached by temporarily placing or temporarily bonding the seal member 24 onto the ink cartridge 30 and pressing a plate of silicone rubber (for example, with a hardness of approximately 70°) called attachment pad against the seal member 24. The seal member 24 is bonded with an adhesive on the seal member 24. The seal member 24 has a thickness of approximately 100 μm to 180 μm. The method for attaching the seal member 24 is not limited to the above method.

The ink cartridge 30 according to the present exemplary embodiment does not have an ink injection port. The ink cartridge 30 is thus formed by injecting ink into the ink storage member 23 and then joining the lid member 22 to the ink storage member 23.

If the used ink cartridge 30 is reused, a new ink injection port for reinjecting the ink is therefore desirably formed. An example of the method for forming a new ink injection port is to machine the opening of the air communication hole 26 with a drill. Here, if the machining is performed with the seal member 24 attached to the air communication hole 26, shavings of the seal member 24 can adhere to the drill and lower productivity. The same applies in the case of machining not the air communication hole 26 but a portion of the lid member 22 where the air communication section 31 is not formed and the seal member 24 is attached. To form a new ink injection port in the lid member 22 with high productivity, the seal member 24 is therefore desirably peeled off. The method for forming an ink injection port in the ink cartridge 30 is not limited to the machining.

Figure 15:
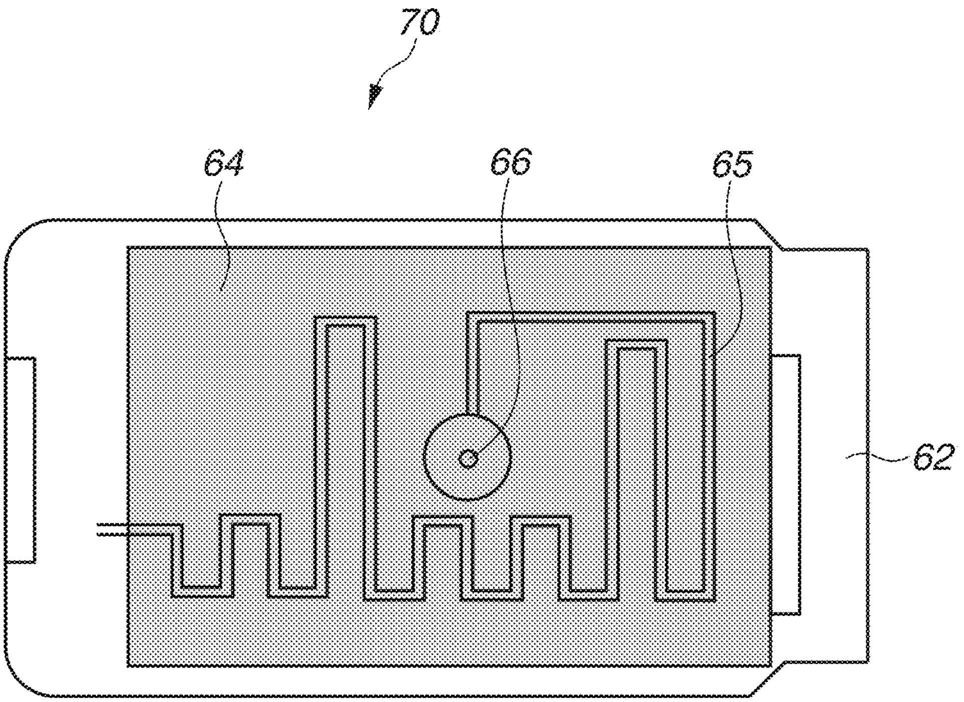
FIG. 15 is a top view of an ink cartridge according to another comparative example.
Figure 16:
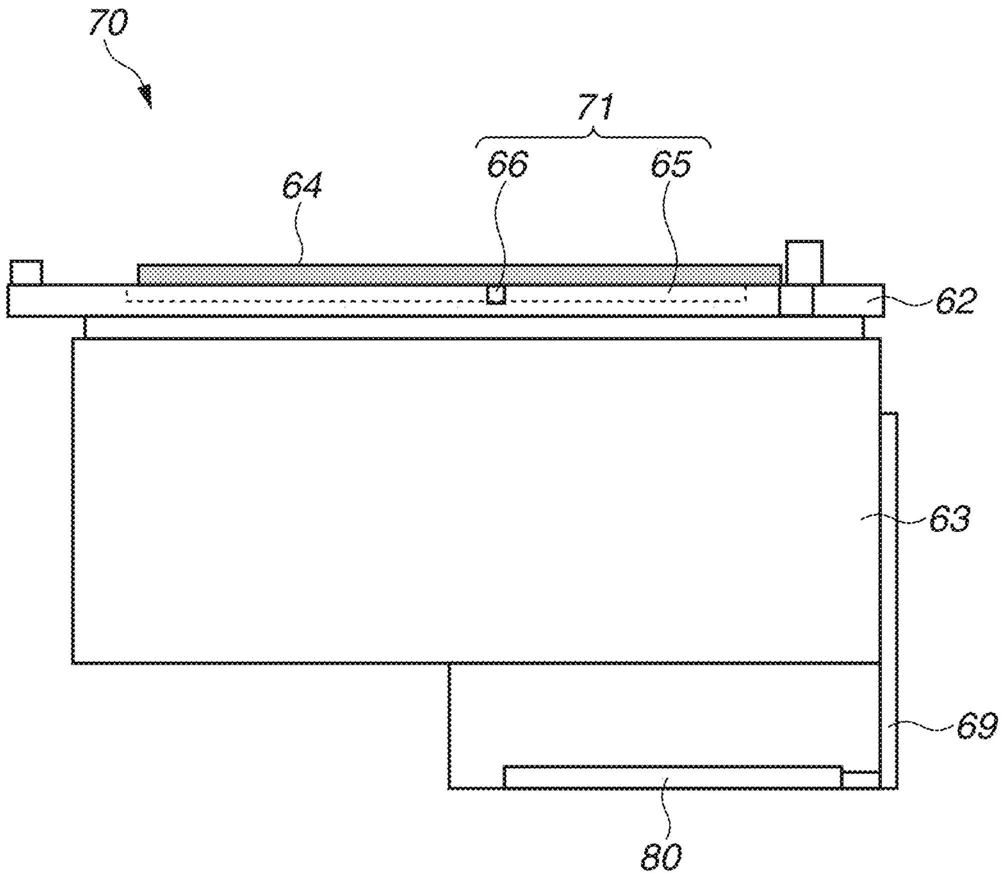
FIG. 16 is a side view of the ink cartridge according to another comparative example.

FIGS. 15 and 16 are a top view and a side view, respectively, of an ink cartridge of a comparative example where an ink injection port is not formed and with which a liquid discharge head (recording element substrate) 80 is integrated. The ink cartridge of the comparative example does not have a starting point to peel the seal member 64, and the seal member 64 can be difficult to peel off. The thinner the seal member 64 is, the more difficult the seal member 64 is to peel off.

The ink cartridge 30 according to the present exemplary embodiment has a recess 32 different from the air communication hole 26 at a position where the lid member 22 is opposed to the attachment surface of the seal member 24. The recess 32 is configured to be covered with the seal member 24 at least in part. With such a configuration, the seal member 24 can be easily peeled off by using the portion of the seal member 24 covering the recess 32 as a starting point. Moreover, an end of the seal member 24 desirably covers at least part of the recess 32. The seal member 24 can thereby be more easily peeled off because the seal member 24 can be peeled starting at the end of the seal member 24 covering the recess 32.

The present exemplary embodiment is suitably applicable to an ink cartridge 30 where the seal member 24 is attached to ½ or more of the total area of the side of the lid member 22 where the seal member 24 is attached. The reason is that such an ink cartridge 30 does not have much area where the seal member 24 is not attached on the side of the lid member 22 where the seal member 24 is attached, and the seal member 24 is likely to interfere with the formation of a new ink injection port.

With such a configuration, even if a new ink injection port is formed in the ink cartridge 30 having no ink injection port, the seal member 24 attached to cover the air communication hole 26 can be easily peeled off because of the presence of the recess 32. This can improve the productivity in forming an ink injection port in the ink cartridge 30. Moreover, the ink cartridge 30 can be easily reused by performing an injection step of reinjecting ink through the ink injection port and an attachment step of attaching a seal member 24 so that the ink injection port and at least part of the recess 32 are covered.

Appropriate combinations of the configurations according to the foregoing exemplary embodiments are also applicable.

An exemplary embodiment of the present disclosure is directed to providing an ink cartridge from which an attached seal member can be easily peeled and a method for remanufacturing such an ink cartridge.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2023-034301, filed Mar. 7, 2023, and No. 2023-209163, filed Dec. 12, 2023, which are hereby incorporated by reference herein in their entirety.

What is claimed is:

1. An ink cartridge comprising:

a casing including an ink storage section that operates to store ink, an air communication hole that is a through hole that operates to cause the ink storage section to communicate with air, and an air communication passage that is a groove connected to the air communication hole; and a seal member that operates to be disposed on an external side or surface of the casing and to cover an entire area of an opening of the air communication hole and an entire area of or a part of the air communication passage, wherein a recess different from the air communication passage is formed in an area of the casing covered with the seal member, and wherein a part of an opening of the recess is exposed from the seal member such that a space extending between the seal member and the recess is accessible via the opening so that the seal member operates to be peeled off of the casing using a portion of the seal member extending over and partially covering the recess.

2. The ink cartridge according to claim 1, wherein the casing includes an ink storage member having an opening and including the ink storage section inside, and a lid member covering the opening of the ink storage member, and wherein the air communication hole and the air communication passage are formed in the lid member, and the seal member is attached to the lid member.

3. The ink cartridge according to claim 1, wherein the seal member has a polygonal shape, and all corners of the seal member are attached to the casing.

4. The ink cartridge according to claim 1, wherein the recess has a length ½ or more of that of the casing in a transverse direction of a surface of the casing where the recess is formed.

5. The ink cartridge according to claim 1, wherein a thickness of a region of the casing where the recess is formed is greater than or equal to that of a region of the casing where the recess is not formed.

6. The ink cartridge according to claim 1, wherein a projection is formed in the recess, and a portion of the seal member is attached to the projection or a portion of an end of the seal member is attached to the projection.

7. The ink cartridge according to claim 1, wherein the air communication passage includes: (i) an opening that operates to receive air from an outside of the case into the air communication passage such that the air flows through the groove toward the air communication hole and (ii) a plurality of bends of the groove and the groove of the air communication passage extends from the air communication hole to the opening of the air communication passage, wherein, in a case where the seal member covers the entire area of the air communication passage, the seal member covers the opening and the plurality of bends of the groove of the air communication passage to prevent ink leakage and evaporation, or wherein, in a case where the seal member covers a part of the air communication passage, the seal member covers only the plurality of bends of the groove of the air communication passage to prevent ink leakage and evaporation, and the seal member leaves exposed the opening of the air communication passage to allow air to enter the ink cartridge.

8. The ink cartridge according to claim 1, wherein a separable portion that operates to separate the seal member is formed between an area of the seal member covering or partially the recess and an area of the seal member covering the air communication hole and the part of or the entire area of the air communication passage.

9. The ink cartridge according to claim 1, wherein the seal member is attached to an area ½ or more of the external side or surface of the casing where the seal member is attached, or the seal member is attached to an area ½ or more of the external side or surface of the casing where the seal member is attached to prevent the seal member from curling up.

10. The ink cartridge according to claim 1, wherein an ink injection port that operates to inject the ink is formed in the casing, and an entire area of the ink injection port is covered with the seal member such that the seal member operates to prevent ink leakage and ink evaporation through the ink injection port.

11. The ink cartridge according to claim 1, wherein the casing further includes: (i) a recording element substrate that operates to discharge the ink; and/or (ii) a supply port that operates to supply the ink to a liquid discharge head that operates to discharge the ink.

12. The ink cartridge according to claim 1, wherein the air communication hole, the air communication passage, and the recess are disposed on or in the external side or surface of the casing including the seal member.

13. The ink cartridge according to claim 2, wherein one or more of the following:

(i) the recess is formed in the lid member;

(ii) the recess is formed in the lid member, and a region of the lid member including the recess has a thickness or a depth that is greater than a thickness or a depth of a different region of the lid member so that the recess is sized and shaped to increase accessibility to the space and to the portion of the seal member extending over and partially covering the recess and to make it easier to peel off the seal member using the portion of the seal member; and/or (iii) the lid member covers the opening of the ink storage member to form and define a joint between the lid member and the link storage member, and the recess is formed at a position in the lid member such that the recess is spaced away from and/or avoids overlapping with the joint.

14. An ink cartridge comprising:

a casing including an ink storage section that operates to store ink, an air communication hole that is a through hole that operates to cause the ink storage section to communicate with air, and an air communication passage that is a groove connected to the air communication hole; and a seal member that operates to be disposed on an external side or surface of the casing and to cover an entire area of an opening of the air communication hole and an entire area of or a part of the air communication passage, wherein a recess different from the air communication passage is formed in an area of the casing covered with the seal member, and wherein an entire area of an opening of the recess is covered with the seal member, and the seal member has a cut in an area disposed over and covering the recess such that the cut operates to permit access to or interaction with the recess and a portion of the seal member disposed over the recess so that the seal member operates to be peeled off of the casing using the portion of the seal member.

15. A method for remanufacturing an ink cartridge having a casing including an ink storage section that operates to store ink, an air communication hole that is a through hole that operates to cause the ink storage section to communicate with air, and an air communication passage that is a groove connected to the air communication hole, and a seal member that operates to be disposed on an external side or surface of the casing and to cover an entire area of an opening of the air communication hole and a part of or an entire area of the air communication passage, wherein a recess different from the air communication passage is formed in an area of the casing covered with the seal member, and a part of an opening of the recess is exposed from the seal member such that a space extending between the seal member and the recess is accessible via the opening so that the seal member operates to be peeled off of the casing using a portion of the seal member extending over and partially covering the recess, the method comprising:

peeling off the seal member with the portion of the seal member extending over and partially covering the recess as a starting point for the peeling.

16. The method according to claim 15, wherein the casing further includes an ink injection port that operates to inject the ink, the method further comprising injecting the ink into the ink storage section through the ink injection port after the peeling off of the seal member.

17. The method according to claim 16, wherein the casing further includes a recording element substrate that operates to discharge the ink.

18. The method according to claim 16, further comprising attaching a second seal member to the casing, wherein the second seal member operates to cover an entire area of the ink injection port, the entire area of the opening of the air communication hole, and the part of or the entire area of the air communication passage.

19. The method according to claim 15, further comprising:

forming an ink injection port that operates to inject the ink into the casing after the peeling off of the seal member; and injecting the ink into the ink storage section through the ink injection port.

20. The method according to claim 19, wherein the casing further includes a supply port that operates to supply the ink to a liquid discharge head that operates to discharge the ink.

* * * * *